July 12, 1960  B. F. STEVENSON  2,944,700

MILK CARTON DRIP RECEPTACLE

Filed April 14, 1958

INVENTOR.
Betty F. Stevenson,
BY
Joseph B. Lindecker.
Attorney.

United States Patent Office 2,944,700
Patented July 12, 1960

2,944,700

MILK CARTON DRIP RECEPTACLE

Betty F. Stevenson, 1106 S. Lombard Ave., Oak Park, Ill.

Filed Apr. 14, 1958, Ser. No. 728,120

4 Claims. (Cl. 220—85)

This invention relates to a handy and economical drip receptacle, and more particularly to an improved holder embodying a drip reservoir for use with paper containers such as milk cartons.

The main object of the invention is to provide a novel and improved milk carton holder which is simple in construction, of suitable size and shape to readily receive a milk carton, and embodying supporting lugs in the base section to elevate the milk carton above the bottom panel of the holder, the condensate or liquid drip from the carton collected in the space between the bottom of the carton and the bottom panel of the holder.

A further object of the invention is to provide an improved holder, or receptacle, for use with a conventional paraffined cardboard type milk carton commonly in use, the holder being a comparatively thin semi-rigid rectangular shaped shell which functions as a jacket for the carton, being of a height less than the height of the carton and made of plastic, thin metal, rubber or any suitable material, supporting lugs elevating the milk carton above the bottom panel of the holder so that milk dripping from the carton will be collected and retained within the well of the holder.

And still a further object of the invention is to provide an improved open top receptacle for retaining a cardboard type milk carton therein, means in the lower portion of the receptacle to elevate the milk carton above the bottom of said receptacle to provide space for the collection of drip, and a channel type means incorporated between two of the side panels and at the junction thereof forming a dispensing medium for the collected drip without the removal of the milk carton from the receptacle.

More specifically, my invention has to do with a substantially rectangular open top plastic receptacle which constitutes a receptacle of slightly greater cross-sectional area than that of a milk carton and which permits the filled carton to be slipped therein, means to support the carton above the closed bottom portion of the receptacle providing a drip reservoir, providing the necessary strength needed while handling the carton in the home and elsewhere without removal thereof from the receptacle, and providing a dispensing corner type means for dispensing any drip collected in the receptacle without removal of the carton from the receptacle.

Further objects and advantages of the invention will become apparent from the following description and the accompanying illustrative drawings.

In the drawings:

Figure 1 is a perspective view showing a drip receptacle constructed in accordance with the invention and illustrating the manner in which the same is used in conjunction with a milk-filled carton; the sidewall of the receptacle shown broken away, the carton also being shown open and ready for dispensing its contents from the top, the carton resting upon lugs in the base of the receptacle with the drip reservoir shown between it and the receptacle.

Figure 1:
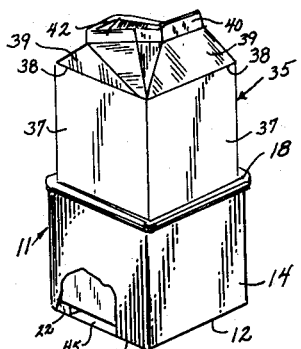
Figure 2:
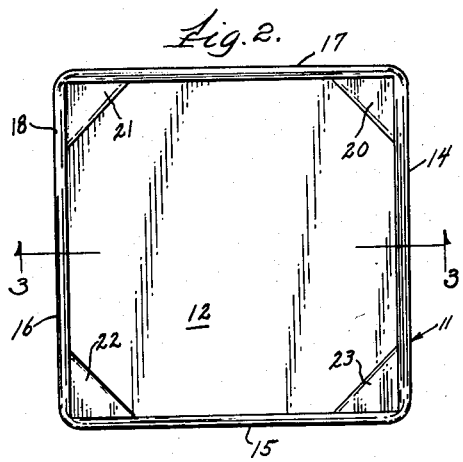
Figure 2 is a top plan view of the drip receptacle.
Figure 4:
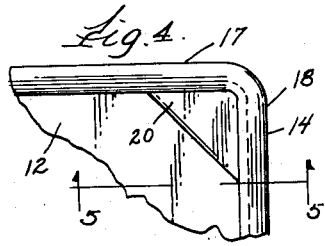
Figure 4 is an enlarged fragmentary top plan view showing one corner of the receptacle with a supporting lug formed therewith.

Referring to the drawings, the improved drip receptacle is designated generally at 11 and comprises a generally rectangular base 12, side walls 14, 15, 16 and 17 with a rolled bead 18 extending about the upper open mouth portion thereof. Integrally formed with the base 12 and adjacent each corner of the receptacle are form supporting means, or lugs 20, 21, 22 and 23.

Figure 6:
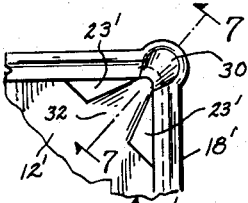
Figure 6 is a fragmentary top plan view of one of the four corners of a drip receptacle, this particular corner embodying a modified type of lug which has a dispensing channel means embodied therewith.
Figure 7:
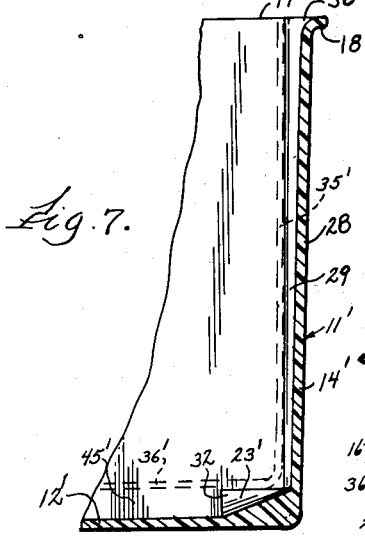
Figure 7 is a fragmentary vertical sectional view taken substantially on line 7—7 of Figure 6, a portion of a carton shown by dotted lines.
Figure 8:
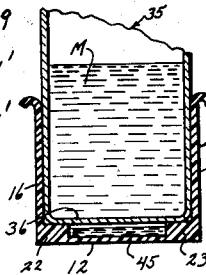
Figure 8 is a fragmentary view in vertical cross-section, of reduced size, showing a container embodying a liquid and supported above the base of the receptacle by lugs formed therewith.

Figures 6 and 7 show a novel modification of the receptacle referred to above. One corner portion 28 of the modified receptacle which is designated generally at 11' is provided with a channel 29 which forms at the junction of base 12', and side walls 14' and 17' and extends upwardly with a gradual increased cross-section forming a U shaped opening, or outlet 30 embodied in the rolled bead 18'. The supporting lug 23' embodies a cone shaped groove 32 therein, said groove providing means for conducting the drip collected on the base 12' into the channel 29 when the receptacle is tilted with the outlet 30 in a position other than its normal upright position.

To all outward appearances, the carton shown in Figure 1, and designated generally at 35 is entirely conventional. Its side walls 37 merge at the top edges 38 with upwardly and rearwardly inclined top walls 39. The top walls are joined together forming a rear sealed tab 40 which can be opened to form a dispensing opening 42 as shown at the forward end thereof.

Figure 3:
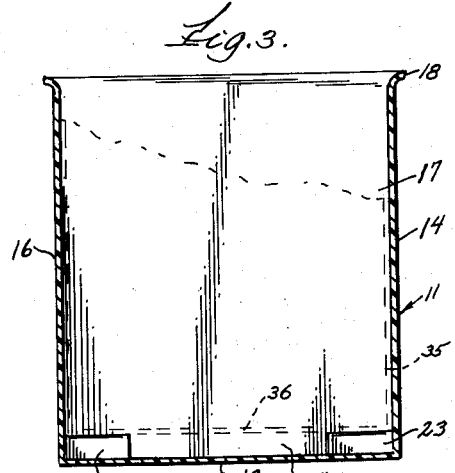
Figure 3 is a vertical sectional view of the drip receptacle taken on lines 3—3 of Figure 2, an outline of a fragmentary portion of a carton shown by dotted lines.
Figure 5:
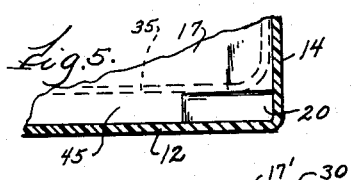
Figure 5 is a fragmentary sectional view taken on line 5—5 of Figure 4; the outline of a base portion of a carton shown dotted.

By Figure 3 the base 36 of the carton 35 is shown dotted and resting upon the lugs 22 and 23. By Fig. 7 the base 36' of the carton 35' is shown dotted and resting on lug 23'. A drip well or reservoir 45, is formed between the lugs 20, 21, 22 and 23 and above the bottom 12. A drip reservoir 45' is formed between the lugs shown in Figures 6 and 7 and above the bottom 12'.

The side walls 14, 15, 16 and 17 and bottom 12 form a comparatively thin semi-rigid substantially rectangular receptacle with an open top, or mouth portion. The receptacle 11 being of a vertical height less than the height of the carton 35 and permitting the upper portion of the carton to protrude so that it may be readily grasped for insertion and removal. The walls of the receptacle are made flexible so as to exert friction-gripping contact against the coacting wall of the carton to assist in holding the carton and to keep the same from possible slipping out when the receptacle and carton are assembled and are tipped, in the usual way when used for pouring milk from the carton. By the novel channel means shown by Figures 6 and 7, the drip will be dispensed by channel 29 whenever the receptacle 11' and carton 35' are tipped with the channel 29 in a lowered position from the normal vertical position thereof.

While the body portion, with side walls 14, 15, 16 and 17 and base 12, has been shown of substantially rectangular form, it will be obvious that the body portion may be formed of substantially cylindrical or other shape to adapt the receptacle to receive cartons of various shapes. It will also be obvious that any suitable means may be employed for supporting the bottom of the carton in elevation above the bottom of the drip reservoir as long as they are rigidly secured to the receptacle.

From the foregoing it will be observed that conventional paraffin coated cardboard type milk cartons 35 may be placed in the receptacle 11 and the contents "M" removed from the carton either by removing the carton from the receptacle or by using the receptacle as a holder.

The conventional type milk cartons effect a drip caused by condensation upon the outer walls thereof due to the temperature differences between the contents within the carton on the air about the carton. This is objectionable in the home kitchen, or in the refrigerator. By this invention the drip can be collected by the reservoir 45 in the receptacle 11.

It is a matter of common knowledge that paraffined cardboard milk cartons are extensively used by dairies all over the country and that while these cartons are possessed of many commercial and other advantages, the housewife and members of the family, the principal users of cartons, encounter the defect that these cartons have been accidently impaired by indentations or the like, the paraffin has been chipped off from portions of the base or side walls allowing milk, or more expensive cream, to drip through small openings or cracks therein. The contents dripping from the carton is generally lost and also causes undue and undesirable unsanitary conditions. By this novel receptacle the milk or cream dripping from the carton is collected and saved for use by pouring the same from the receptacle, into another vessel or container. By embodying the novel channel dispensing means 29 in one or more corners of the receptacle, the receptacle can be used as a holder for dispensing the contents of the carton yet retaining the drip in the reservoir, or the receptacle can be tipped with the carton in closed condition, the drip being dispensed from the channel 29 and drip reservoir 45' without removal of the milk carton therefrom.

It is thought that persons skilled in the art to which the invention relates will be able to obtain a clear understanding of the invention from the above description in connection with the drawings. Therefore, a more lengthy description is regarded unnecessary.

Minor changes in the shape, size and arrangement of details coming within the field of invention may be resorted to in actual practice, if desired.

I claim as my invention:

1. A milk drip collecting receptacle embodying a single corner type dispensing channel for partially enclosing and supporting a conventional-type cardboard milk carton comprising a one-piece open top receptacle formed from moldable material and being light in weight, substantially crush-proof and semi-rigid in construction and of a shape and size to telescopically receive the carton and to enclose the lower end portion of said carton to prevent squeezing and collapsing of the carton when it is being handled, said receptacle being substantially rectangular in cross-section with closed bottom and open top end, of a height less than the height of the carton, and embodying four substantially rectangular shaped and imperforate side walls, said receptacle provided on its interior and with its bottom a plurality of opposed lugs, the latter being integrally formed with the bottom and side walls but separate and independent from each other and having upper carton seating and supporting surfaces, a plurality of said supporting surfaces being flat and one of said supporting surfaces embodying a cone shaped groove therein, said surfaces being relatively broad, in the same plane, and elevated above the bottom of the receptacle to elevate and support the base of a milk carton clear above the surface of the bottom of the receptacle forming a drip well for collecting drippings from said milk carton in the lower region of said receptacle, said carton being of rectangular cross-section and interchangeably mounted in said receptacle, and a corner edge portion between two of the side walls of the receptacle formed with a dispensing channel means extending from the upper edge of the receptacle to said supporting surface with said cone shaped groove, said groove extending to a point within said well and adapted to dispense the drippings from said well to the distal end thereof.

2. The combination with a holder for cartons containing milk or the like fluid, the holder open at the top and provided with a rectangular shaped imperforated bottom and four integral imperforated side walls with a single corner type dispensing channel, the channel extending substantially vertically upwardly at the juncture of two of said side walls, of a cardboard carton interchangeably mounted therein and provided above the peripheral top of said holder with a liquid dispensing opening, integral molded lugs at the corner juncture of the side walls and the bottom wall to provide a support for said carton above the bottom wall of said holder, a tapered groove in the one corner lug intermediate the dispensing channel and the bottom wall of said holder, the bottom wall and the lower portions of said side walls of said holder forming a cup adapted to retain drippings from the base and side walls of said carton, and said tapered groove in said lug and said corner type dispensing channel adapted to guide the drippings from said cup toward the distal end of said dispensing channel and to the exterior of said holder.

3. The combination according to claim 2, wherein said dispensing channel is characterized by being concavo-convex curvature transversely and straight longitudinally, the transverse curvature being graduated and of shorter radius adjacent the lowermost end thereof.

4. The combination with a holder for cartons containing milk, the holder open at the top and provided with a rectangular shaped imperforated bottom wall and four integral imperforated rectangular shaped side walls, with a single corner type dispensing channel extending upwardly at the juncture of two of said side walls from the base portion of said holder to the upper exterior peripheral edge thereof, of a cardboard carton interchangeably mounted therein and provided above said carton holder with a top wall dispensing opening, said carton being characterized by flexible sides which bulge laterally beyond a vertical projection of the top and bottom ends thereof when the carton is at least partially filled with milk, said carton holder being integrally molded of flexible plastic material, said bottom wall of said carton holder being substantially the same outline as the bottom end of said cardboard carton, said side walls extending upwardly from said bottom wall and integrally formed therewith, integrally molded lugs at the corner juncture of the side walls and the bottom wall, said lugs having a height to provide a support for the cardboard carton on a level spaced vertically above the bottom wall of said carton holder, the corner lug intermediate said dispensing channel and the bottom wall of said holder having a groove therein and in alignment with said dispensing channel, said single dispensing channel molded integrally with its adjoining side walls and being of concavo-convex configuration, the transverse curvature being graduated and of shorter radius adjacent the lowermost end thereof, and said groove in said lug and said dispensing channel adapted to convey the drippings from said cardboard carton collected in said holder below said carton to the distal end thereof and to the exterior of said holder.

References Cited in the file of this patent

UNITED STATES PATENTS

| | | |
|---|---|---|
| 973,085 | Strause | Oct. 18, 1910 |
| 2,115,654 | Swofford | Apr. 26, 1938 |
| 2,600,911 | Olson | June 17, 1952 |
| 2,784,577 | Beaham | Mar. 12, 1957 |
| 2,868,411 | Kesselman | Jan. 13, 1959 |